| COMMUTATOR POSITION | OUTPUTS | | | |
| --- | --- | --- | --- | --- |
| | 1 | 2 | $\ell$ | $p$ |
| 1 | 0 | $e_2 - e_1$ | $e_\ell - e_1$ | $e_p - e_1$ |
| 2 | $e_1 - e_2$ | 0 | $e_\ell - e_2$ | $e_p - e_2$ |
| $\ell$ | $e_1 - e_\ell$ | $e_2 - e_\ell$ | 0 | $e_p - e_\ell$ |
| $n$ | $e_1 - e_n$ | $e_2 - e_n$ | $e_\ell - e_n$ | $e_p - e_n$ |

United States Patent Office 3,205,431
Patented Sept. 7, 1965

3,205,431
ELECTRICAL TRANSDUCER CIRCUIT
Kennan Clark Herrick, Jr., Berkeley, Calif., assignor to the United States of America as represented by the Secretary of the Navy
Filed Sept. 27, 1962, Ser. No. 227,668
5 Claims. (Cl. 323—94)

This invention pertains to a target voltage generation device and is particularly directed towards a target voltage generation device for use in a radar simulator.

In radar simulator devices wherein it is required to generate simulated targets, these targets are generated by means of voltage dividing circuits. It is also desired to simulate targets by means of simulative voltages so that said electrical voltages are responsive to mechanical inputs. A selected output voltage represents sequentially, the algebraic sum of the mechanical input which is directly associated with the selected output and each other mechanical input.

It is therefore an object of the instant invention to provide a novel mechanical, electrical converter which employs a plurality of potentiometers.

A further object of the instant invention is to provide novel electrical transducer circuits wherein several electrical output voltages are provided in response to several mechanical inputs so that a selected output voltage represents sequentially the algebraic sum of the mechanical input which is directly associated with the selector output and each other mechanical input.

Another object of the instant invention is to provide a novel electrical transducer circuit for converting mechanical shaft positions to electrical signals wherein only one potentiometer is associated with each mechanical input and voltage output.

Figure 1:
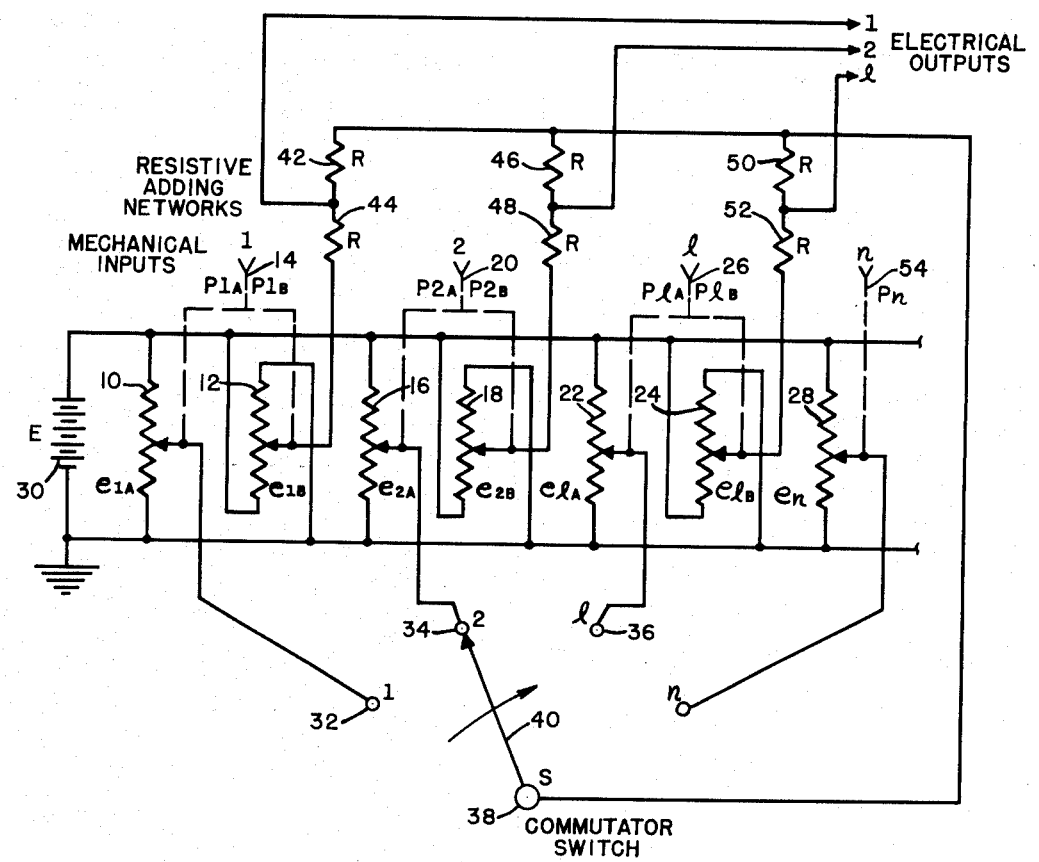
Figure 2:
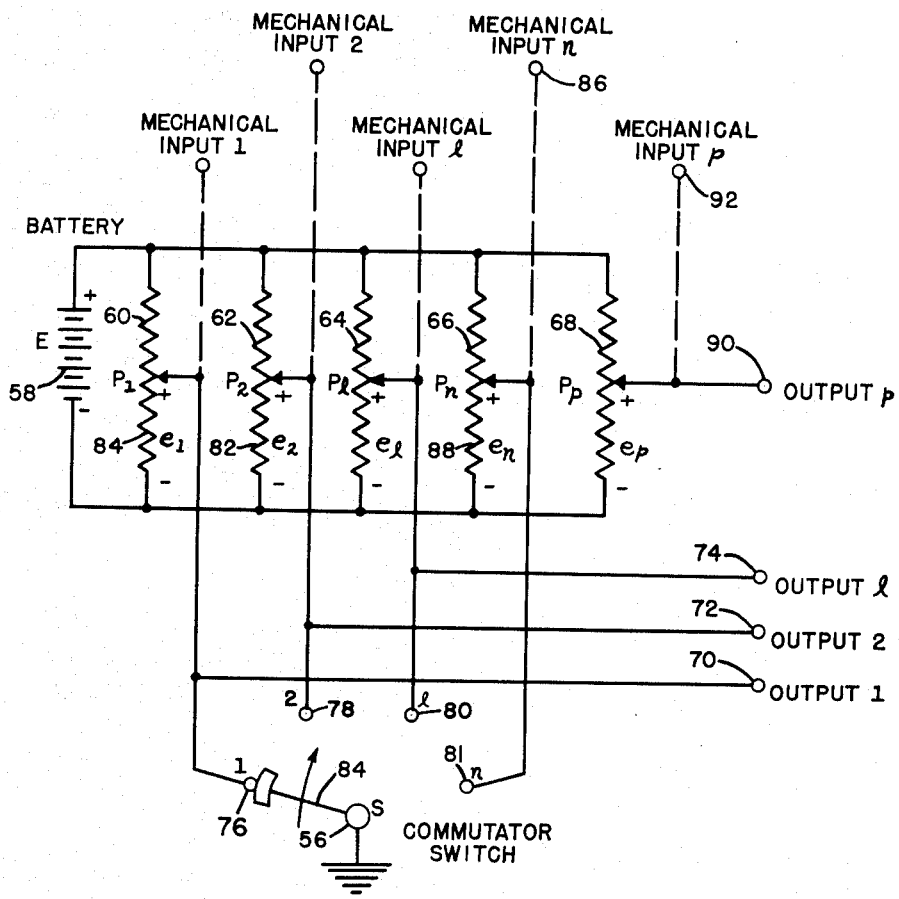

Other objects and many of the attendant advantages of this invention will be readily appreciated as the same becomes better understood by reference to the following detailed description when considered in connection with the accompanying drawings wherein:

FIG. 1 is a schematic diagram of the circuitry previously used to produce the required electro-mechanical transducer; and FIG. 2 is a schematic diagram of a preferred embodiment of the instant invention.

Referring now to the previously utilized circuitry shown in FIG. 1, this circuit requires the use of two electrical potentiometers coupled to each mechanical input, i.e., potentiometers 10 and 12. The potentiometers 10 and 12 coupled to input 14; the potentiometers 16 and 18 coupled to input 20; the potentiometers 22 and 24 coupled to input 26; and the single potentiometer 28 has a directly associated output voltage. Voltage 30 is the voltage source for potentiometers 10, 12, 16, 18, 22, 24 and 28. One potentiometer of each pair, i.e., 10, 16 and 22 have respective directly associated outputs 32, 34 and 36. Commutator switch 38 has fixed positions 32, 34, 36, and $n$ each connected to the sliding contact of associated potentiometers 10, 16, 22 and 28 respectively. The moving contact of the commutator 40 is connected to one end of the resistor adding networks, one resistor pair 42–44, 46–48, 50–52 respectively, being associated with each of the potentiometer pairs. The movable contact of potentiometer pairs 10–12, 16–18 and 22–24 is positioned by associated mechanical inputs 14, 20 and 26. Potentiometer 28 has an associated mechanical input 54.

Due to the opposite electrical connection of one section of each of the dual potentiometers, the sum of the voltages on the sliding contacts of each dual potentiometer with respect to ground is always E. Assuming that the adding network resistors cause negligible potentiometer loading, the output voltage of each adding network has a value which equals one-half the sum of the two applied voltages, one applied voltage derived from one section of the dual potentiometer and the other applied voltage from the moving contact of the commutator switch.

Referring to the tabulation of FIG. 1, it will be seen that the circuit output voltages vary with the relationship required; namely, that a selected output voltage represents sequentially the algebraic sum of the mechanical input which is directly associated with the selected output and each other mechanical input. The main disadvantages of the circuitry shown in FIG. 1 are as follows:

(1) Two potentiometers are required for each mechanical input which has an associated electrical output voltage;

(2) The accuracy of each voltage output is a function of (a) the tracking accuracy of two ganged potentiometers, (b) the relative linearities of two potentiometers not mechanically coupled to one another, and (c) the relative precision of two adding network resistors leads to greater inaccuracies;

(3) Two output voltages, each representing the sum of their mutual mechanical inputs, differ from $E/2$ by amounts which ideally are equal, one being more positive than $E/2$, the other more negative. The equality of these differential voltages is affected by: (a) the tracking accuracy of the two ganged potentiometers connected to the first mechanical input, (b) the tracking accuracy of the two ganged potentiometers connected to the second mechanical input, (c) the linearity of the potentiometer connected to the first mechanical input and directly connected to the adding network versus that of the potentiometers connected to the second mechanical input and connected to the commutator switch, (d) the linearity of the potentiometer connected to the first mechanical input and connected to the commutator switch versus that of the potentiometer connected to the second mechanical input and directly connected to the adding network, (e) the relative precisions of the two resistors comprising the adding network for the first output voltage, and (f) the relative precisions of the two resistors comprising the adding network for the second output voltage;

(4) The system reference voltage, that is, the value of an output voltage at the time the movable commutator switch is scanning the corresponding stationary terminal, is fixed at one-half the potentiometer supply voltage.

FIG. 2 is a schematic circuit diagram of the preferred embodiment of the instant invention, together with a tabulation of the various output voltages for the several positions of the commutator switch 56. In the circuit, the voltage 58 is the source of voltage for energizing potentiometers 60, 62, 64, 66 and 68. Potentiometers 60, 62 and 64 have respective directly associated variable outputs 70, 72 and 74. Commutator switch 56 has positions 76, 78, 80 and 81 respectively, connected to the outputs of potentiometers 60, 62, 64 and 66. The rotor 84 of commutator switch 56 is shown connected to ground reference, which is also the reference for outputs 70, 72 and 74. When the commutator switch makes connection to terminal 76, output 70 is at ground reference, or zero volts. When the switch connects to terminal 78, output 72 is at zero, and when the switch connects to terminal 80, the output 74 is zero.

Considering the voltage at a given output, such as output 72, for a given position of the commutator switch 56 (except the position that connects output 78 to ground reference), such as position 76, it is seen that the value of the output voltage is the difference between voltage 82 of the directly associated potentiometer and the voltage 84 of the potentiometer whose sliding contact is connected to ground reference by the commutator switch. Since the voltage outputs of the potentiometers are functions of the respective mechanical inputs, any given circuit output voltage is a function of the difference between the mechanical input of the directly associated potentiometer and the mechanical input of the potentiometer whose electrical output is momentarily connected to ground reference by the commutator switch.

Potentiometer 66 has a mechanical input 86, but does not have a directly associated electrical output. The mechanical input of potentiometer 66 is, however, represented by voltage 88, combined in sequence in each of the circuit output voltages. Potentiometer 68 has an electrical output 90 and a mechanical input 92, but is not connected to the commutator switch. The output voltage of potentiometer 68 is a function consecutively of the difference between the mechanical input 92 and the mechanical inputs of the potentiometers connected in turn through the commutator switch to the ground reference. However, since potentiometer 68 is not connected to the commutator switch, the mechanical input 92 is not represented as a component of any other output voltage.

Thus it is seen by means of single potentiometers for each mechanical input and a commutator switch, a selected output voltage represents sequentially the sum of the mechanical inputs which is directly associated with the selected output and each of the mechanical inputs.

The advantages of the instant invention over the prior art:

(1) Only one potentiometer is required for each mechanical input;

(2) The accuracy with which any given circuit output voltage represents the difference between the directly associated mechanical input and another mechanical input is a function only of the relative linearities of the two associated potentiometers;

(3) Any two output voltages that represent the difference of mutual mechanical inputs are exact negatives of each other; and (4) The system reference voltage may be made any convenient value, merely by returning the common circuit of the commutator switch to the desired potential source.

In the circuit of FIG. 2, the battery 58 may be replaced with any desired type of power source, either alternating or direct current. The potentiometers 60, 62, 64, 66 and 68 may be replaced with other electrical transducers of capacitive or inductive type.

Obviously many modifications and variations of the present invention are possible in light of the above teachings. It is therefore to be understood that within the scope of the appended claims the invention may be practiced otherwise than as specifically described.

What is claimed is:

1. A transducer system for providing a plurality of electrical output signals corresponding to the interrelations of a plurality of mechanical input signals, comprising:

a first source of fixed electrical potential;

a plurality of potentiometer means, each potentiometer means including a resistance and a movable tap therefore, each resistance coupled to said first source of electrical potential;

a plurality of mechanical signal sources, each respectively coupled to only one of said potentiometer means movable taps for moving said respective tap relative to its associated resistance in response to the respective mechanical signal;

a plurality of electrical output lines, each respectively coupled to one of said potentiometer means movable taps;

a reference source of fixed electrical potential;

means for selectively coupling one of said potentiometer means movable taps to said reference potential source, whereby the potential at said output line of said selected potentiometer means movable tap is equal to the reference potential, and the potential at any other of said output lines with respect to said reference potential source is responsive to the difference between the mechanical signal applied to said movable tap to which that output line is coupled and the mechanical signal applied to said movable tap to which said reference potential source is coupled.

2. The device as in claim 1 wherein each of said electrical output lines of said plurality of electrical output lines are each respectively directly coupled to one of said potentiometer means movable taps.

3. A transducer system for providing a plurality of electrical output signals corresponding to the interrelations of a plurality of mechanical input signals, comprising:

a first source of fixed electrical potential;

a plurality of potentiometer means, each potentiometer means including a resistance and a movable tap therefor, each resistance coupled to said first source of electrical potential;

a plurality of mechanical signal sources, each respectively coupled to one of said potentiometer means movable taps for moving said respective tap relative to its associated resistance in response to the respective mechanical signal;

a plurality of electrical output lines, each respectively directly coupled to one of said potentiometer means movable taps;

a reference source of fixed electrical potential;

means for selectively coupling one of said potentiometer means movable taps to said reference potential source, whereby the potential at said output line of said selected potentiometer means movable tap is equal to the reference potential, and the potential at any other of said output lines with respect to said reference potential source is responsive to the difference between the mechanical signal applied to said movable tap to which that output line is coupled and mechanical signal applied to said movable tape to which said reference potential source is coupled.

4. A transducer system for providing a plurality of electrical signals corresponding to the interrelations of a plurality of mechanical input signals, comprising:

a first source of fixed electrical potential having two output terminals;

a plurality of potentiometers, each potentiometer including a resistance and movable tap therefor, and each resistance coupled across said output terminal of said first electrical potential source;

a plurality of mechanical signal sources, each respectively coupled to one of said potentiometer movable taps for moving said respective tap relative to its associated resistance in response to the respective mechanical signal;

a plurality of electrical output lines each respectively coupled to one of said potentiometer movable taps;

a second source of fixed electrical potential;

means for selectively coupling one of said potentiometer movable taps to said second potential source, whereby the potential at said output line of said selected potential movable tap with respect to said second potential source is zero, and the potential at any other of said output lines with respect to said second potential source is responsive to the difference between the mechanical signal applied to said movable tap to which that output line is coupled and the mechanical signal applied to said movable tap to which said second potential source is coupled.

5. A transducer system for providing a plurality of electrical signals corresponding to the interrelations of a plurality of mechanical input signals, comprising:

a first source of fixed electrical potential having two output terminals;

a plurality of potentiometers, each potentiometer including a resistance and movable tap therefor, and each resistance coupled across said output terminal of said first electrical potential source;

a plurality of mechanical signal sources, each respectively coupled to a single one of said potentiometer movable taps for moving said respective tap relative to its associated resistance in response to the respective mechanical signal;

a plurality of electrical output lines each respectively coupled to a single one of said potentiometer movable taps;

a second source of fixed electrical potential;

means for selectively coupling one of said potentiometer movable taps to said second potential source, whereby the potential at said output line of said selected potential movable tap with respect to said second potential source is zero, and the potential at any other of said output lines with respect to said second potential source is responsive to the difference between the mechanical signal applied to said movable tap to which that output line is coupled and the mechanical signal applied to said movable tap to which said second potential source is coupled.

References Cited by the Examiner
UNITED STATES PATENTS 2,152,704    4/39    Massonneau _____ 200—11
3,068,466   12/62    Lindley _____ 323—94

LLOYD McCOLLUM, *Primary Examiner.*